Patented Dec. 22, 1953

2,663,742

UNITED STATES PATENT OFFICE 2,663,742

PROCESS FOR PRODUCTION OF METHYLAL

Ludo K. Frevel and John William Hedelund, Midland, Mich., assignors to The Dow Chemical Company, Midland, Mich., a corporation of Delaware No Drawing. Application May 22, 1948,
Serial No. 28,736

8 Claims. (Cl. 260—615)

This invention concerns an improved method for making methylal by oxidation of methanol. It pertains especially to the production of methylal by oxidation of methanol vapor while in admixture with a halogen or a hydrogen halide and an oxidizing agent in the presence of an oxidation catalyst. The reaction to form methylal may be represented by the equation $$6CH_3OH + O_2 \rightarrow 2CH_2(OCH_3)_2 + 4H_2O$$

A number of processes are known for the catalytic oxidation of methyl alcohol in admixture with air or oxygen to produce formaldehyde. Such processes have been carried out employing oxygen in stoichiometric proportions and in greater or lesser amounts than the theoretical proportion required to oxidize the methanol to formaldehyde. In general, the organic product obtained by the known processes consists largely of formaldehyde, alone or together with small amounts of methylal as a by-product or impurity.

We have discovered that methylal may be obtained in good yield by a catalytic vapor phase oxidation of methanol while admixed with a halogen or a hydrogen halide. Formaldehyde, if formed at all, is obtained only in traces. The halogen or hydrogen halide apparently directs the reaction toward formation of methylal and is referred to herein as a directing agent. In the absence of such directing agent, the methanol is largely converted to other products such as carbon monoxide, carbon dioxide, hydrogen, water, and in some instances formaldehyde, etc.

Examples of halogens and hydrogen halides that may be employed as directing agent are chlorine, bromine, iodine, hydrogen chloride, hydrogen bromide, hydrogen iodide, and mixtures of any two or more of such substances. The hydrogen halides may be used in gaseous form or as a concentrated aqueous solution.

Oxidizing agents that may be used are oxygen, air or other gas containing molecular oxygen, and elemental halogens. A halogen may be employed, both as a directing agent and as the oxidizing agent, in amount corresponding to from 0.02 to 0.167 of the molecular equivalent of the methanol, in which case no oxygen need be added. However, such use of a halogen as the sole oxidizing agent leads to increased production of a methyl halide and a corresponding decrease in yield of methylal. The reaction is preferably carried out using an oxygen-containing gas as the oxidizing agent and a halogen, or a hydrogen halide, as a directing agent.

The catalyst for promoting the reaction to form methylal is preferably composed of copper, copper compounds, or copper in admixture with other metals, although other usual oxidation catalysts, e. g. silver oxidation catalysts, may be used. Typical catalysts that may be employed are copper, copper oxide, cuprous chloride, 95% silver 5% copper, 96.5% iron 3.5% copper, 90% chromium, 10% copper, molybdenum dioxide ($MoO_2$), and chromic oxide ($Cr_2O_3$), and mixtures of two or more of such substances. The catalysts may be used in various forms such as shavings, turnings, granules, or powder, but preferably consist of the metal oxide, or metal, in a finely divided form supported on a carrier such as diatomaceous earth, porcelain, or quartz, etc. A supported copper catalyst may be formed by impregnating Sil-O-Cel, a diatomaceous earth, with a concentrated solution of copper nitrate and roasting the resultant material at a high temperature, e. g. 400° C. or above, until the copper nitrate is decomposed and a deposit of copper oxide obtained. The oxide may then be reduced to the metal by treatment with hydrogen. Supported catalysts of this kind desirably contain from 2 to 20 per cent by weight of the catalytic metal, or metal oxide. Mixed metal catalysts may be prepared in similar manner by impregnating a carrier with a concentrated solution of a mixture of decomposable salts of the metals, e. g. copper nitrate-silver nitrate, copper nitrate-ferric nitrate, copper nitrate-chromium nitrate, etc., and roasting the resultant material to form the oxides of the metals. The oxides may then be reduced to the metal by treatment with hydrogen, if desired.

The stoichiometric amount of oxygen to oxidize methanol to methylal is one mol of molecular oxygen for six mols of methanol, as represented by the above equation. In practice, the amount of oxygen mixed with the methanol in the reaction zone is preferably not greater than one-half of that theoretically required to oxidize the methanol to methylal. Usually from 0.040 to 0.083 mol of oxygen per mol of methanol is employed. This corresponds to from 12 to 25 parts by volume of methanol vapor per part of gaseous oxygen. The oxygen may be substantially pure, e. g. from an oxygen cylinder, or it may be mixed with an inert gas such as nitrogen, helium, or the like. Air is preferably employed as the source of oxygen, since the non-reactive gases, e. g. nitrogen, serve as a diluent to increase the velocity of the reacting gases, shorten the contact time, spread the reactants over a larger surface, and to absorb and aid in dissipating heat.

The halogen or hydrogen halide, used as a directing agent, may be employed in amount corresponding to from 0.01 to 0.20, preferably 0.01 to 0.10 molecular equivalent, per mol of methanol fed to the reactor. Smaller amounts of the directing agent are not effective in preventing considerable formation of decomposition products, i. e. carbon oxides, hydrogen, etc. Employment of the directing agent in amounts greater than the upper limit just indicated usually results in formation of a substantial proportion of methyl halide and in flow of free halogen or a hydrogen halide from the reaction zone. In operation, the proportion of halogen or halogen halide added to the reactants as a directing agent is controlled according to the conditions prevailing in the reaction zone. If large amounts of vent gases, i. e. carbon monoxide, carbon dioxide, hydrogen, etc., are being formed, indicating excessive decomposition of the methanol, the proportion of directing agent is increased. On the other hand, if an excessive amount of the methanol is being converted to methyl halide, the proportion of directing agent is decreased. The directing agent is preferably added in vapor form.

In practice, a mixture of methanol and the gaseous oxidizing agent is brought to a temperature sufficient for vaporization of the methanol but below the reaction temperature, e. g. between 80° and 200° C., prior to being fed to the reaction. Usually, methanol and an oxygen-containing gas, e. g. oxygen or air, are fed to a heated vaporizing chamber at relative rates such as to form a vapor mixture containing at least 12 molecular equivalents of methanol per mol of oxygen and preheated vapors of a halogen or a hydrogen halide are added at an average rate corresponding to from 0.01 to 0.2 molecular equivalent of the halogen or hydrogen halide per mol of the methanol. The resultant vapors are passed into the reaction zone where they are heated to a reaction temperature in contact with the oxidation catalyst. It is not necessary that the halogen or hydrogen halide be fed in steady flow to the reaction zone, since the directive effect of such agent in causing formation of methylal persists for some time after feed of the agent is interrupted. It appears that the halogen or hydrogen halide either modifies the oxidation catalyst or is absorbed by the latter at the reaction temperature. Because of its persisting action, the feed of the halogen or hydrogen halide may be continuous or intermittent, as desired.

The reaction may be carried out at atmospheric pressure or superatmospheric pressure, e. g. at a gauge pressure of from 1 to 50 pounds per square inch, and at temperatures between 350° C. and 500° C. The overall reaction is exothermic. A desired reaction temperature may be maintained by controlling the proportion of reactants fed to the reactor. More particularly, the reaction temperature is controlled by the proportion of methanol to oxidizing agent, e. g. oxygen, fed to the reactor. For instance, an increase in the proportion of oxygen to methanol fed to the reactor causes an increase in the degree of oxidation occurring in the reaction zone and correspondingly an increase in the reaction temperature. Conversely a decrease in the proportion of oxygen to methanol results in a lowered reaction temperature. A large excess of methanol to oxygen may result in cessation of the reaction by undue lowering of the temperature in the reaction zone. To provide for more ready control of the reaction temperature, external heating or cooling may be applied to the reactor. A diluent gas, e. g. nitrogen, helium, $CO_2$, $CO$, etc., may be mixed with the reactant vapors to aid in controlling the temperature. Thus, a portion of the vent gases from the process may be withdrawn and recycled, as diluent gas, to the reactor.

The reaction time should not be so long as to cause excessive decomposition of the reactants or products. Usually a reaction time of from 0.1 to 5 seconds is sufficient to convert a substantial portion of the methanol to methylal in a single pass through the catalyst bed. It is desirable to employ a short contact time so as to rapidly dissipate heat from the reaction zone and thus avoid burning of the reactants and products. At contact times of from 0.1 to 5 seconds, preferably 0.1 to 2 seconds, from 15 to 35 per cent of the methanol fed to the reactor usually reacts, per pass through the reaction zone, to produce methylal in yields of from 75 to 90 per cent of theoretical, based on the reacted methanol.

The reaction vapors, consisting substantially of methylal, methyl halide, unreacted methanol, and water, together with the permanently gaseous products such as nitrogen, carbon monoxide, carbon dioxide, hydrogen, etc., are cooled to condense the higher boiling reaction products and separate them from the permanently gaseous products formed during the reaction and the inert gases, e. g. nitrogen, fed to the reactor. The gaseous products are preferably passed through a refrigerated condenser and cooled sufficiently to liquefy and separate methyl halide, and residual amounts of methylal product and unreacted methanol, and then vented to the atmosphere. The liquefied products are fractionally distilled to obtain separate fractions of methyl halide, methylal, and unreacted methanol. The latter may be recycled to the reactor.

The following examples illustrate practice of the invention, but are not to be construed as limiting the scope thereof. In the examples, vapors are reported by volume at room conditions, i. e. at 25° C. and 1 atmosphere pressure, unless otherwise stated.

EXAMPLE 1

Methanol was fed at a rate of 11.4 grams (0.356 mol) per minute into admixture with 600 cc. (0.027 mol) of oxygen and 50 cc. of nitrogen per minute and the mixture passed into a vaporizer heated to 80° C. Hydrogen chloride gas, preheated to a temperature of 110° C., was added, at a rate of 260 cc. (0.012 mol) per minute, to the vapor stream. The resultant mixture of vapors immediately passed through a bed of catalyst consisting of 20 per cent by weight copper supported on Sil-O-Cel, a diatomaceous earth, heated to a temperature of 470° C. The temperature remained at substantially 470° C. throughout the reaction period. The reaction was continued until a total of 2469 grams (77.1 mols) of methanol, 186 grams (5.80 mols) of oxygen, 13.6 grams (0.48 mol) of nitrogen and 96.4 grams (2.64 mols) of hydrogen chloride had been fed to the reaction zone. The reaction vapors were cooled to condense the higher boiling reaction products. The remaining gases were passed through a trap, cooled with a slush of $CO_2$ and an equimolar mixture of $CHCl_3$ and $CCl_4$, to condense and recover the methyl chloride product together with residual amounts of methylal and unreacted methanol. The liquefied products were combined and fractionally distilled. There was obtained 151 grams (2.99 mols) of methyl chloride, 368 grams (4.84 mols) of methylal and 1865 grams (58.3 mols) of unreacted methanol. The yields were 77.0 per cent methylal and 15.9 per cent methyl chloride, based on the reacted methanol. The reacted methanol corresponded to 24.4 per cent by weight of the methanol fed to the vaporizer. The permanently gaseous products from the reaction contained 29.8 per cent by volume carbon dioxide, 0.6 per cent oxygen and 1.6 per cent carbon monoxide, the remainder being principally hydrogen and nitrogen.

EXAMPLE 2

Methanol was fed at a rate of 13.2 grams (0.412 mol) per minute into admixture with 3500 cc. of air per minute, measured at 25° C. and 760 mm. of Hg, absolute, and the mixture preheated to a temperature of 110° C. Hydrogen chloride gas, preheated to a temperature of 110° C., was mixed with the preheated air and methanol vapors at a rate of 0.012 mol of HCl per minute and the combined vapors immediately passed through a bed of catalyst consisting of 20 per cent by weight copper and 80 per cent diatomaceous earth, heated to a temperature of 440° C. The temperature increased to 445° C. and was maintained at 440° to 445° C. throughout the reaction period. The reaction was continued until 4621 grams (144 mols) of methanol, 150.7 grams (4.13 mols) of hydrogen chloride, and 1225 liters of air were fed into the reaction zone. The reaction vapors were cooled to condense the liquid reaction products and the gaseous products passed through a cold trap to separate methyl chloride, together with residual amounts of methylal and unreacted methanol, from the permanent gases. The condensates were combined and fractionally distilled. There was obtained 176 grams (3.48 mols) of methyl chloride, 801 grams (10.5 mols) of methylal, and 3479 grams (109 mols) of unreacted methanol. The yields were 9.9 per cent methyl chloride and 90.0 per cent methylal, based on the reacted methanol. The reacted methanol corresponded to 24.3 per cent by weight of the methanol fed to the reactor. The vent gases contained 7.2 per cent by volume carbon dioxide, 0.4 per cent carbon monoxide, and no free oxygen, the remainder being chiefly hydrogen and nitrogen.

EXAMPLE 3

By procedure similar to that described in Example 2, methanol was fed at a rate of 12.4 grams (0.387 mol) per minute into admixture with 3500 cc. of air per minute, and the mixture preheated to a temperature of 180° C. Hydrogen chloride gas, preheated to a temperature of 180° C., was fed into the preheated air and methanol vapor mixture at a rate of 0.012 mol per minute. The combined vapors passed immediately over the catalyst used in the preceding example, heated to a temperature of 380° C. The reaction was continued until 4456 grams (139 mols) of methanol, 155.1 grams (4.25 mols) of hydrogen chloride, and 1260 liters of air, were fed into the reaction zone. The reaction products were recovered by procedure described in the preceding example and the liquefied products fractionally distilled. There was obtained 63 grams (1.24 mols) of methyl chloride, 759 grams (9.84 mols) of methylal, and 3251 grams (101.3 mols) of unreacted methanol. The yields were 3.3 per cent methyl chloride, and 78.1 per cent methylal, based on the reacted methanol. The reacted methanol was 27.2 per cent by weight of the methanol fed to the reactor. The vent gases contained 7.0 per cent by volume carbon dioxide and 1.0 per cent oxygen.

EXAMPLE 4

Methanol was fed at a rate of 13.3 grams (0.415 mol) per minute into admixture with 50 cc. of nitrogen per minute, measured at 25° C., and 1 atmosphere pressure, and the mixture preheated to a temperature of 100° C. Chlorine gas, preheated to a temperature of 100° C., was fed at a rate of 1.42 grams (0.020 mol) per minute into admixture with the preheated nitrogen and methanol vapors and the combined vapors immediately passed through a bed of catalyst consisting of 19.3 parts by weight iron, 0.7 part copper, and 80 parts diatomaceous earth, heated to a temperature of 350° C. The reaction was continued until 4026 grams (125 mols) of methanol, 430 grams (6.06 mols) of chlorine, and 15.1 liters of nitrogen, were fed to the reactor. The nitrogen was employed to provide a positive flow of vapors through the reactor. The reaction vapors were cooled to condense the organic products and separate them from the nitrogen and permanent gases formed in the reaction. The liquefied products were combined and fractionally distilled. There was obtained 354 grams (7.0 mols) of methyl chloride, 99 grams (1.30 mols) of methylal, and 3511 grams (109.6 mols) of unreacted methanol. The yields were 68.7 per cent methyl chloride, and 19.2 per cent methylal, based on the reacted methanol. The vent gases contained 3.0 per cent by volume carbon dioxide, 2.8 per cent oxygen, and 28.0 per cent carbon monoxide, the remainder being largely nitrogen and hydrogen.

EXAMPLE 5

A liquid solution of methanol and concentrated aqueous hydrochloric acid, in the proportions of 9 parts by volume of methanol per part of concentrated, i. e. 35 per cent, aqueous hydrochloric acid solution, was fed at a rate of 3.5 milliliters per minute into a vaporizer heated to a temperature of 110° C. Oxygen and nitrogen were fed at rates of 100 cc. and 25 cc. per minute, respectively, into admixture with the preheated vapors of methanol and hydrochloric acid. The combined vapors were passed into an iron tube 4 centimeters in diameter and 64 centimeters long, packed to a depth of 56 centimeters with a granular catalyst consisting of 80 parts by weight of diatomaceous earth having deposited thereon 19 parts of finely divided silver and 1 part of finely divided copper. The contact time, i. e. the time for flow of an infinitesimal portion of the vapors through the bed of catalyst, was 3.6 seconds. The reaction vapors were cooled to condense the organic products and separate them from the permanently gaseous products. The condensate was fractionally distilled to separate methyl chloride, methylal, and unreacted methanol. The experiment was repeated several times, except that the reaction temperature and the kind of catalyst were varied. In the following table there is reported the composition of the catalyst used in each experiment, the temperature at which the reaction was carried out, and the yield of methylal, expressed as per cent of the weight of methanol fed to the reactor.

Table

| Catalyst, parts by weight | Temperature, °C. | Percent methylal by weight |
|---|---|---|
| 20 copper, 80 Sil-O-Cal | 355–375 | 22 |
| 20 copper oxide, 80 Sil-O-Cel | 360 | 11 |
| 19 silver-1 copper, 80 Sil-O-Cel | 460 | 20 |
| 19.3 iron-0.7 copper, 80 Sil-O-Cel | 375 | 9 |
| 18 chromium-2 copper, 80 Sil-O-Cel | 305–385 | 12 |
| 20 molybdenum dioxide, 80 Sil-O-Cel | 370 | 3 |
| 20 chromic oxide, 80 Sil-O-Cel | 340–380 | 6 |

As shown in the table, the copper oxidation catalysts and catalysts containing copper have greatest activity for promoting the reaction to produce methylal, by direct oxidation of methanol in the presence of a directing agent, e. g. hydrogen chloride.

Other modes of applying the principle of our invention may be employed instead of those explained, change being made as regards the method or products herein disclosed, provided the steps or products stated in any of the following claims or the equivalent of such stated steps or products be employed.

We therefore particularly point out and distinctly claim as our invention:

1. A process for making methylal which comprises simultaneously passing one molecular equivalent of oxygen and at least 12 mols of vaporized methanol into contact with an oxidation catalyst at a reaction temperature between 350° C. and 500° C. and, during feed of the vapors into contact with the catalyst, also introducing a directing agent of the class consisting of halogens and hydrogen halides into the mixture of reaction vapors and catalyst at an average rate corresponding to from 0.01 to 0.2 molecular equivalent of said directing agent per mol of the methanol.

2. A process for making methylal which comprises passing, in admixture with one another, vapors of one molecular equivalent of oxygen, at least 12 mols of methanol, and from 0.01 to 0.20 mol of a directing agent per mol of methanol, said directing agent being from a group consisting of halogens and hydrogen halides, into contact with a copper oxidation catalyst at a reaction temperature between 350° C. and 500° C.

3. A process for making methylal which comprises passing, in admixture with one another, vapors of one molecular equivalent of oxygen, at least 12 mols of methanol, and from 0.01 to 0.20 mol of hydrogen chloride per mol of the methanol, through a bed of an oxidation catalyst at a reaction temperature between 350° C. and 500° C.

4. A process for making methylal which comprises passing, in admixture with one another, vapors of one molecular equivalent of oxygen, at least 12 mols of methanol, and from 0.01 to 0.20 mol of hydrogen bromide per mol of the methanol, through a bed of an oxidation catalyst at a reaction temperature between 350° C. and 500° C.

5. A process of making methylal which comprises passing, in admixture with one another, vapors of one molecular equivalent of oxygen, at least 12 mols of methanol, and from 0.01 to 0.20 mol of chlorine per mol of methanol, through a bed of an oxidation catalyst at a reaction temperature between 350° C. and 500° C.

6. A process of making methylal which comprises passing, in admixture with one another, vapors of one molecular equivalent of oxygen, at least 12 mols of methanol, and from 0.01 to 0.20 mol, of a directing agent per mol of methanol, said directing agent being of a group consisting of halogens and hydrogen halides, through a bed of an oxidation catalyst at a reaction temperature between 350° C. and 500° C., cooling the reaction vapors to condense organic products, and recovering methylal from the condensate.

7. A process, as described in Claim 2, wherein air is employed as the source of oxygen.

8. A process of making methylal which comprises passing, in admixture with one another, vapors of one molecular equivalent of oxygen, at least 12 mols of methanol and from 0.01 to 0.20 mol of hydrogen chloride per mol of the methanol, through a bed of an oxidation catalyst at a reaction temperature between 350° C. and 500° C., cooling the reaction vapors to condense organic products, and recovering methylal from the condensate.

LUDO K. FREVEL.
JOHN WILLIAM HEDELUND.

References Cited in the file of this patent

UNITED STATES PATENTS

| Number | Name | Date |
| --- | --- | --- |
| 1,738,745 | Weith et al. | Dec. 10, 1929 |
| 2,337,059 | Mikeska et al. | Dec. 21, 1943 |
| 2,473,994 | Gresham | June 21, 1949 |